United States Patent
Engle

(10) Patent No.: US 7,255,449 B2
(45) Date of Patent: Aug. 14, 2007

(54) STABILIZER FOR OPTICAL DEVICES

(75) Inventor: T. Scott Engle, Tualatin, OR (US)

(73) Assignee: InFocus Corporation, Wilsonville, OR (US)

( * ) Notice: Subject to any disclaimer, the term of this patent is extended or adjusted under 35 U.S.C. 154(b) by 238 days.

(21) Appl. No.: 10/917,568

(22) Filed: Aug. 13, 2004

(65) Prior Publication Data

US 2006/0033891 A1 Feb. 16, 2006

(51) Int. Cl.
- G03B 3/00 (2006.01)
- G03B 21/14 (2006.01)
- G03B 21/22 (2006.01)
- G02B 27/64 (2006.01)

(52) U.S. Cl. .............. 353/101; 353/119; 353/121; 359/554; 359/557

(58) Field of Classification Search .............. 353/101, 353/119, 121; 359/813, 811, 819, 822, 554–557
See application file for complete search history.

(56) References Cited

U.S. PATENT DOCUMENTS

| 5,659,806 | A  | * | 8/1997  | Miyamoto et al. ........... 396/54 |
| 6,603,611 | B1 | * | 8/2003  | Hookman .................... 359/811 |
| 6,811,266 | B2 | * | 11/2004 | Lung et al. .................. 353/101 |
| 2002/0044264 | A1 | * | 4/2002 | Lu ............................. 353/101 |
| 2002/0093629 | A1 | * | 7/2002 | Watanabe .................... 353/101 |
| 2004/0114115 | A1 | * | 6/2004 | Runco ......................... 353/101 |
| 2005/0185152 | A1 | * | 8/2005 | Velde et al. ................. 353/101 |

OTHER PUBLICATIONS

Vukobratovich Daniel, Video Short Course Notes, "Introduction to Optomechanical Design", SPIE, Copyright 1986 (2 pages attached).

* cited by examiner

*Primary Examiner*—Melissa Jan Koval
(74) *Attorney, Agent, or Firm*—Alleman Hall McCoy Russell & Tuttle LLP

(57) ABSTRACT

An apparatus, system and method for stabilizing components is provided. In some embodiments, an apparatus for positioning an optical component relative to a frame is provided including a stabilizer. The stabilizer may be configured to be coupled to the optical component and the frame, wherein in a first configuration the stabilizer is configured to enable select adjustment of the optical component in at least two directions and in a second configuration a position of the optical component may be fixed.

41 Claims, 4 Drawing Sheets

STABILIZER FOR OPTICAL DEVICES

FIELD

The present disclosure relates to a apparatus, system and method for stabilizing components, including a stabilizer for optical components.

BRIEF DESCRIPTION OF THE DRAWINGS

The disclosure is illustrated by way of example and not by way of limitation in the figures of the accompanying drawings, in which the like references indicate similar elements and in which.

DETAILED DESCRIPTION

Figure 1:
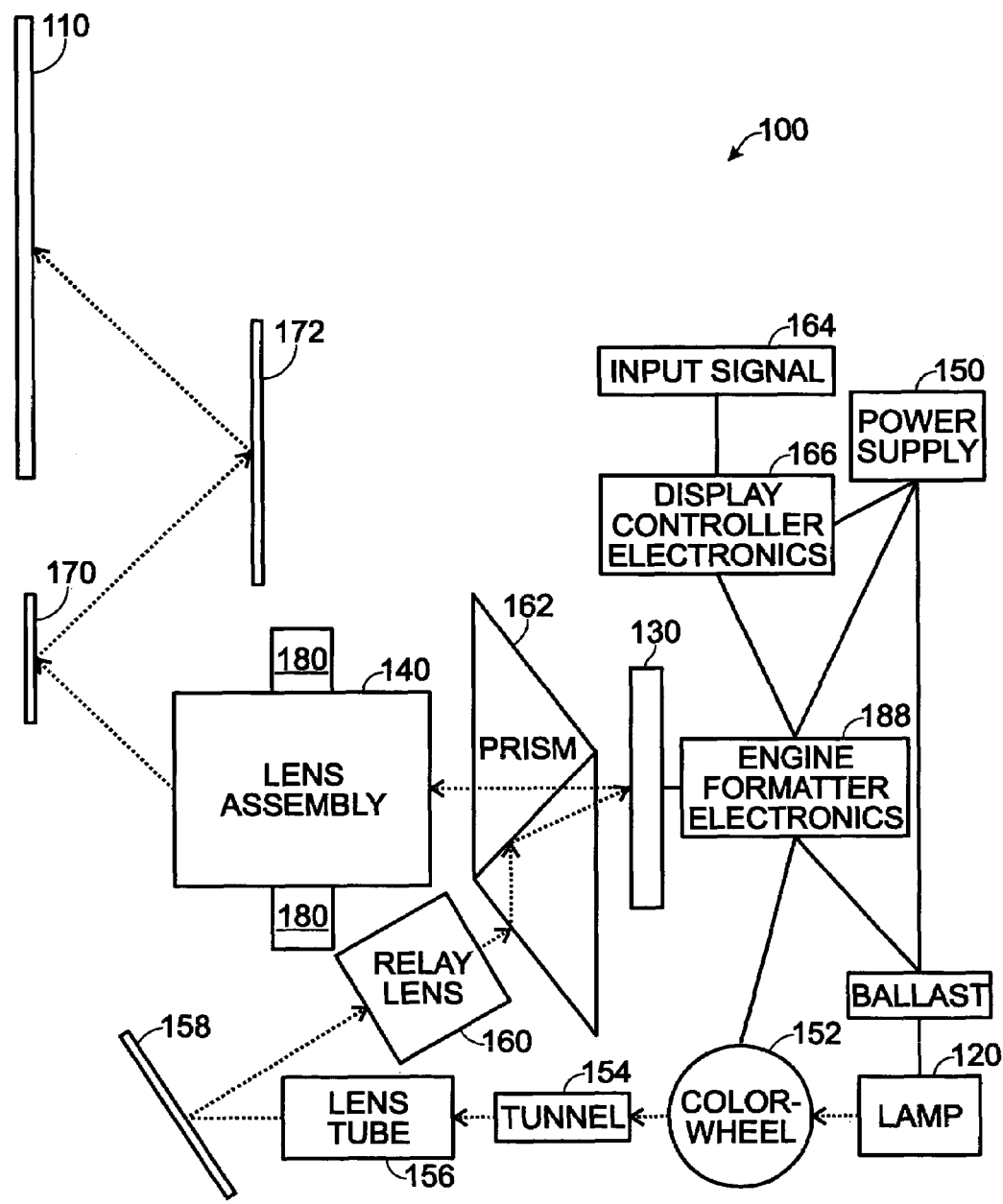
FIG. 1 is a block diagram of the internal components of an exemplary projection device, in which the stabilizer system of the present disclosure may be implemented.

An exemplary image generation and projection system 100 is illustrated in FIG. 1. Referring to FIG. 1, projection system 100 may be adapted to generate and project an image on a display or viewing surface, including, but not limited to, a screen, a wall, or other viewing surface or area 110. As used herein, projection system 100 may include any suitable image projector or display device, including, but not limited to, a digital projector, a liquid crystal display (LCD) projector, a digital light processing projector, a rear projection device, a front projection device, etc.

Referring to FIG. 1, light source or lamp 120 may be adapted to produce a beam of light and project the light toward a display device 130. Display device 130, in turn, may be configured to generate an image and project it through lens assembly 140. Light source 120 may include any suitable type of lamp. Examples include, but are not limited to, metal halide lamps and ultra-high-pressure (UHP) arc lamps, lasers, light emitting diodes (LED), etc. The light source 120 may be powered by any appropriate power supply 150. The system also may include one or more filters, such as an infrared (IR) or ultraviolet (UV) filter, to filter out unwanted parts of the emission spectra of the lamp.

In some embodiments, light source 120 may include a lamp positioned within a reflector that is configured to direct most of the emitted light along an optical path of the system to display device 130. The optical path may include color-wheel 152, tunnel 154, lens tube 156, fold mirror 158, relay lens 160, and prism 162. After the emitted light travels through prism 162, it may be received by display device 130. Likewise, an input signal 164 may be processed by display controller electronics 166 and engine formatter electronics 168 before being received by display device 130.

Display device 130 may be, but is not limited to, a digital micro-mirror (DMD), an LCD panel, or any other suitable image source. Display device 130 may generate an image based upon the processed input signal and emitted light which it receives. Display device 130 may be configured to project such an image through projection optics toward a display or viewing surface 110.

The projection optics may include lenses, mirrors, prisms, and other suitable optics. Such lenses and other suitable optics may be aggregated to form a single assembly, referred to as lens assembly 140. Lens assembly 140 may also integrate additional components such as, but not limited to, an optical engine and the components illustrated in FIG. 1. In some embodiments, lens assembly 140 may be configured to be coupled to an optical engine or the like.

Lens assembly 140 may be supported by one or more stabilizers 180, which are discussed in more detail below. The stabilizers may be adapted to enable select adjustment of the position of the lens assembly within the projection system such that the lens assembly is in an operative position. The stabilizers further may be secured to the lens assembly such that the lens assembly is supported and maintained in the operative position.

It will be understood that the particular arrangement of projection system 100 is depicted for illustrative purposes only, and that lens supports 180 may be employed to support optical components, where feasible, in any optical system, including, but not limited to, front, rear, liquid crystal display, digital, and digital light processing projectors.

Figure 2:
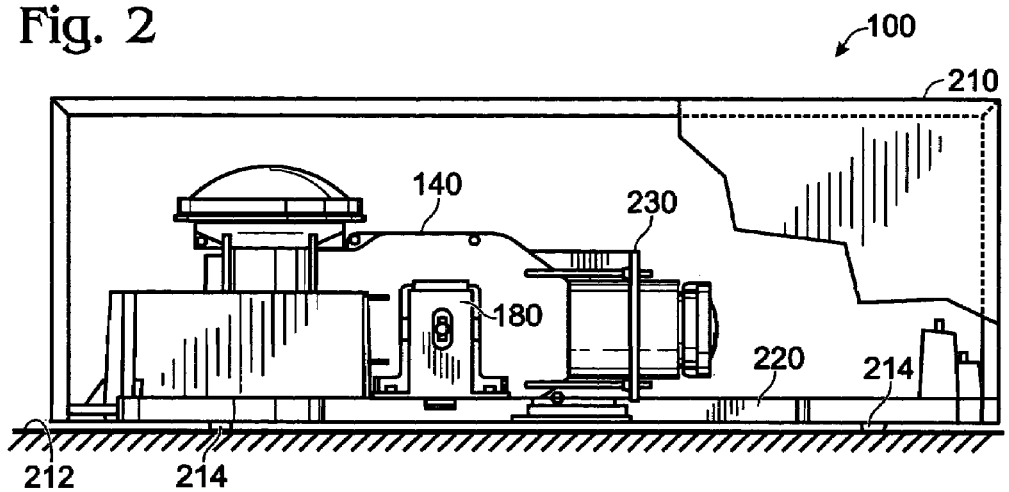
FIG. 2 is an elevation view of the projection device of FIG. 1, illustrating the housing, frame, and internal components of the device.

Referring to FIG. 2, exemplary projection system 100 typically includes a body or housing 210. Housing 210 may be configured to house the varied components of the projection system 100, and to stabilize the device on a support surface 212 such that the projected image is directed to a selected display surface. Housing 210 may include one or more stabilizing protrusions 214 to assist in the positioning of housing 210 on such a support surface 212. For example, a support surface may be a table, a ledge, a chair, a shelf, a floor, etc. Alternatively, projection system 100 may be configured to be suspended from a surface that is located above the system, such as a ceiling or the underside of a shelf.

Figure 3:
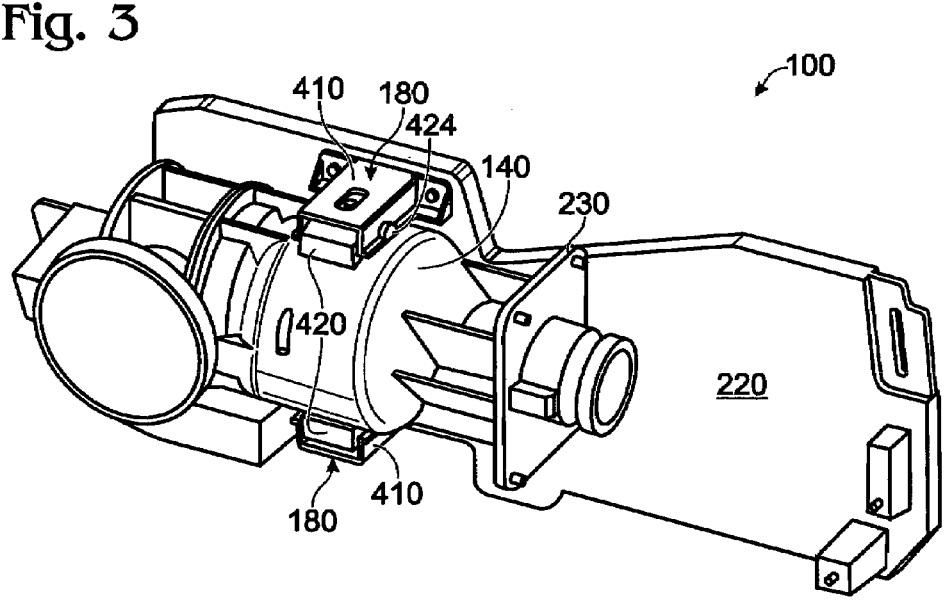
FIG. 3 is a perspective view of the projection device of FIG. 2, illustrating a lens assembly, a frame, and stabilizers according to some embodiments of the present disclosure.

Referring to FIGS. 2 and 3, the internal components of projection system 100, such as lens assembly 140, may be stabilized in an operational orientation, maintaining alignment and focus, such that the optical components may properly project an image onto a viewing surface. Such stabilization may be provided to prevent a component, such as lens assembly 140, from becoming misaligned or out-of-focus due to the force of its own weight or an impact sustained by the projection system 100.

For example, internal projection components, such as lens assembly 140, may be stabilized in their respective positions within housing 210 by securing them relative to a base plate or frame 220. Lens assembly 140 may be supported relative to frame 220 and/or additional components of the projection system by a support or several supports, one of which may be retainer 230. In the illustrated embodiment, a retainer 230 may be provided to couple lens assembly 140 to additional components or frame 220. A configuration where lens assembly 140 is supported solely by retainer 230 at one end may be referred to as a "cantilever-style" design. In some embodiments, the lens assembly 140 may be too heavy to be adequately supported in the cantilever-style. Further, the alignment of lens assembly 140 may be of such sensitivity that maintenance of the position of the lens assembly relative the other components may be important.

For example, in some embodiments, lens assembly 140 may be supported by one or more stabilizers 180. Stabilizers 180 may support lens assembly 140 so that it maintains the alignment and focus corresponding to a desired operational orientation. When an optical component, such as lens assembly 140, is positioned in a desired operational orientation relative to frame 220, stabilizers 180 may be positioned to jointly engage the optical component and the frame. Stabilizers 180 may also be secured to stabilize the optical component at the desired operational orientation relative to the frame 220. Accordingly, in a first configuration, stabilizer 180 may be movably coupled to the optical component and frame 220 in order to enable adjustment of stabilizer 180 and corresponding lens assembly 140 to a suitable operative position that corresponds to the desired operational orientation of the component or lens assembly 140. Thus, stabilizer 180 may be selectively adjusted and then fixedly coupled to the optical component and the frame in order to provide stabilization for the component or lens assembly 140 once a suitable position has been attained by adjustment.

Stabilizers 180 may engage both lens assembly 140 and frame (or base plate) 220 such that lens assembly 140 is stabilized with respect to frame 220. For example, stabilizers may be secured to frame 220. Further, in some embodiments, stabilizers 180 may be disposed on substantially opposite sides of lens assembly 140 such that they jointly engage or clamp lens assembly 140. In such embodiments, stabilizers 180 may be coupled to the mid-section or lens barrel of lens assembly 140 such that the assembly 140 is held between opposing stabilizers 180.

In order to position stabilizers 180 to jointly engage an optical component and a frame 220, stabilizers 180 may be adjusted in multiple directions to provide support for the optical component in the desired operational orientation. Accordingly, the use of exemplary stabilizers 180, in accordance with some embodiments, enables an optical component to be positioned at an orientation that is variable in at least two directions. Such multi-directional adaptability of stabilizers 180 increases the range of potential operational orientations for which stabilizers 180 may provide suitable support for a component such as lens assembly 140.

In some embodiments, stabilizers 180 are capable of adjustment in multiple directions because they are configured to enable incremental movements such as sliding, pivoting, and rotating. For instance, stabilizers 180 may be configured to slide along a first axis relative to frame 220, pivot about a second axis orthogonal to the first axis, and provide rotation for an optical component about a third axis that is also orthogonal to the first axis. Such multi-directional movement of stabilizers 180 enables them to be adjusted to provide support for components such as lens assembly 140 in diverse operational orientations.

Figure 4:
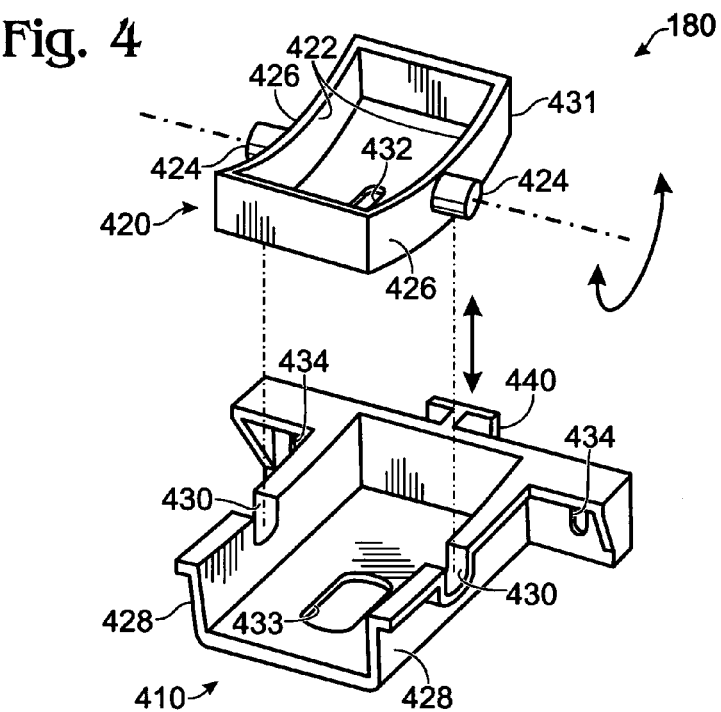
FIG. 4 is a perspective view of a stabilizer, including a bracket and a cradle, according to some embodiments of the present disclosure.

Referring to FIGS. 3 and 4, an exemplary stabilizer 180 may be an assembly that includes a bracket 410 and a cradle 420. Bracket 410 and cradle 420 may movably engage each other. Furthermore, bracket 410 may engage frame 220 and cradle 420 may engage lens assembly 140, such that lens assembly 140 is stabilized with respect to frame 220. Cradle 420 may have an inner surface 422 that is configured to engage lens assembly 140. For example, inner surface 422 may be shaped to fit against the engaged surface of lens assembly 140. Specifically, where lens assembly 140 is cylindrical, inner surface 422 of cradle 420 may be concave such that it substantially matches the radius of curvature of the outer surface of lens assembly 140. Each cradle 420 may engage lens assembly 140 on each side of the axis defined by cradle pivot pins 424, which are discussed in greater detail below.

Cradle 420 may also be coupled to lens assembly 140 by any suitable fastening device, such as with a screw. For example, cradle 420 may be designed with a lateral slot 432 extending along its outer surface, the lateral slot 432 having such a width that the shaft of a selected screw may pass through the slot and engage projection lens assembly 140. In a first configuration, cradle 420 may be loosely coupled to projection lens assembly 140 such that the length of slot 432 provides a margin of movement or rotation for projection lens assembly 140 relative to cradle 420. In a second configuration, cradle 420 may be fixedly coupled to projection lens assembly 140 such that assembly 140 is rigidly secured with respect to cradle 420.

Cradle 420 may also engage a bracket 410. For example, cradle 420 may have side walls 426 that are narrower than the side walls 428 of bracket 410, such that cradle 420 may be seated within the bracket 410. Bracket 410 also may have a lateral slot 433 extending along its bottom surface that is aligned with the slot 432 in cradle 420. Slot 433 in bracket 410 may be of greater width than the corresponding slot 432 in cradle 420, such that the outer surface of bracket 410 does not obstruct the insertion of a screw into cradle 420 via the cradle's slot 432.

Cradle 420 further may include pivot pins 424 projecting from its side walls 426 such that the pivot pins 424 engage apertures 430 in the side walls 428 of bracket 410, so that cradle 420 can pivot with respect to bracket 410. In some embodiments, cradle 420 may be held in place relative to its corresponding bracket 410 by the pressure generated when opposing lens supports 180 clamp down upon both sides of lens assembly 140. In other embodiments, cradle 420 may be fixed in relation to bracket 410 by any suitable means, such as a screw.

Figure 5:
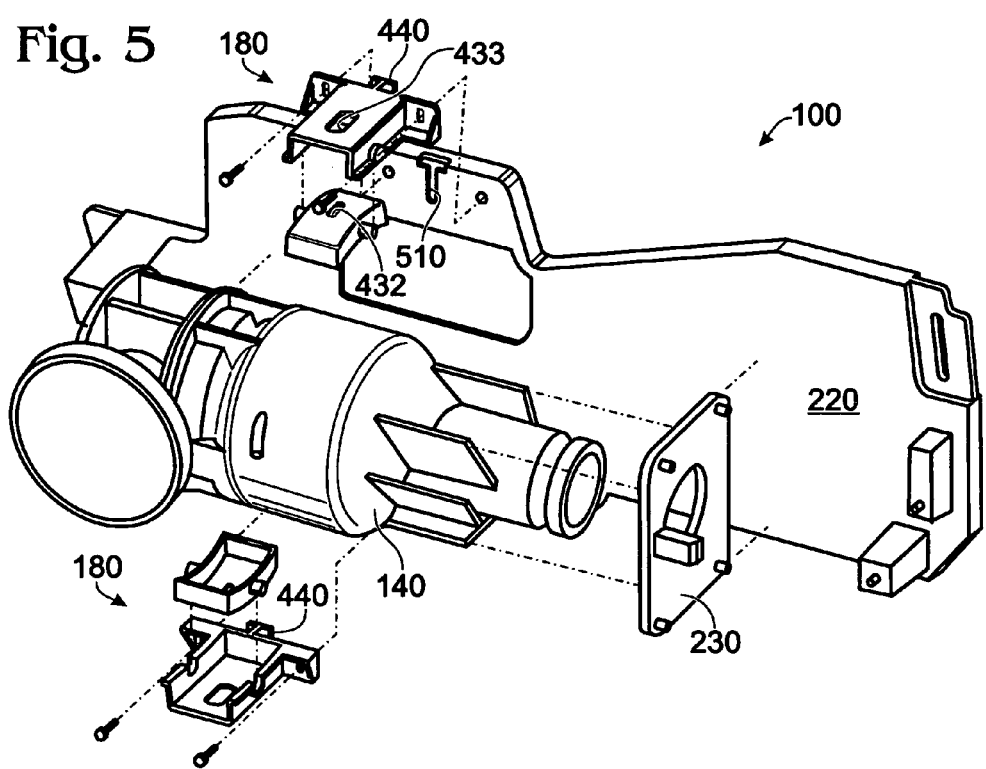
FIG. 5 is an exploded perspective view of the exemplary projection device illustrated in FIG. 3, in which the stabilizer system of the present disclosure may be implemented.

In some embodiments, bracket 410 may be configured to engage a base support or frame 220. For example, bracket 410 may include one or more bracket slots 434 extending along an end surface and an alignment structure, such as T-guide 440 extending from the end surface. Referring to FIGS. 4 and 5, bracket slots 434 may have such a width that the shafts of selected screws may pass through slots 434 and engage internal frame 220. In a first configuration, the screws may loosely couple bracket 410 to internal frame 220 such that the length of the slots 434 provides a margin of movement for bracket 410 relative to internal frame 220. In a second configuration, the screws may tightly couple bracket 410 to internal frame 220 such that bracket 410 is rigidly secured with respect to internal frame 220. Accordingly, projection lens assembly 140 may be stabilized relative to frame 220 by coupling lens assembly 140 to cradle 420, cradle 420 to bracket 410, and bracket 410 to frame 220.

In embodiments where brackets 410 retains a substantially perpendicular orientation with respect to frame 220, brackets 410 or frame 220 may include means to prevent one component from tilting with respect to the other. For example, bracket 410 may include a T-guide 440 on the end surface that engages frame 220. In such embodiments, frame 220 also includes a T-channel 510 within which T-guide 440 is configured to be positioned.

As discussed above, brackets 410 may be adjusted relative to frame 220 in a first configuration, in order to assume a suitable supportive position with respect to component or lens assembly 140 before being coupled to frame 220 in a second configuration. In some embodiments, bracket 410 retains a substantially perpendicular orientation with respect to frame 220 while bracket 410 is adjusted or slides relative to frame 220. When stabilizers 180 are disposed on substantially opposite sides of lens assembly 140, the forces exerted by the opposing stabilizers 180 upon the lens assembly 140 may remain counterbalanced such that the assembly 140 is maintained in the desired operational orientation.

Figure 6:
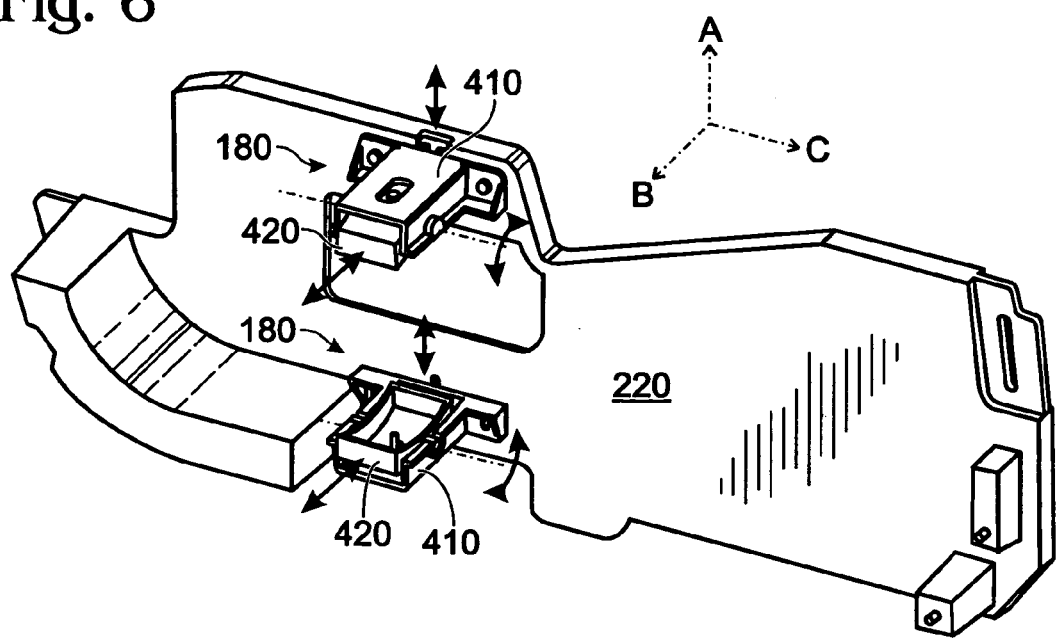
FIG. 6 is a perspective view of the frame and stabilizers illustrated in FIG. 3.

One or more of stabilizer 180 may be configured to enable adjustment of lens assembly 140 in two or more axes. Such adjustment capabilities may enable precise positioning of the lens assembly relative the light engine (and/or other components) such that the lens generates a desired image. Referring to FIG. 6, adjustment may be possible in one or more of a combination of axes, axis A, axis B, and axis C. In a configuration where brackets 410 are loosely coupled to frame 220, stabilizers 180 may be capable of a range of movement relative to frame 220 along a first axis A, where the range of movement may be constrained by the length of bracket slots 434. In a configuration where cradles 420 can pivot with respect to the brackets 410, lens assembly 140 is capable of a range of movement relative to frame 220 along a second axis B, where the range of movement may be constrained by the length of the arc through which cradles 420 may pivot. In a configuration where lens assembly 140 is engaged, but not coupled, to cradles 420, lens assembly 140 may be capable of a range of movement relative to stabilizers 180 and frame 220 along a third axis C. In a configuration where cradles 420 are loosely coupled to lens assembly 140, lens assembly 140 may be capable of a range of rotation relative to stabilizer 180 and frame 220, where the axis of rotation is parallel to a third axis C and the range of rotation may be constrained by the length of lateral slots 432, 433.

As discussed above, lens assembly 140 may be supported by stabilizers 180 at a selected orientation within the margin defined by possible ranges of movement along axis A, axis B, and axis C. For example, lens assembly 140 may be positioned at a desired operational orientation relative to axes A, B, C. Cradles 420 may be movably coupled to lens assembly 140. Brackets 410 may be movably coupled to frame 220 and moved along axis A toward each other until they encounter cradles 420. Keeping lens assembly 140 in the desired orientation, cradles 420 may be rotated about lens assembly 140, with an axis of rotation parallel both to axis C and the axis defined by pivot pins 424, until pivot pins 424 of cradles 420 engage the apertures 430 of brackets 410. Cradles 420 may pivot with respect to brackets 410 such that lens assembly 140 remains positioned at the desired operational orientation. Brackets 410 may be moved closer together along axis A until they firmly clamp down upon cradles 420 and lens assembly 140, in which position brackets 410 may be fixedly coupled to frame 220. Cradles 420 may be fixedly coupled to lens assembly 140. In such an illustrative manner, lens assembly 140 may be stabilized at a select orientation by positioning the assembly 140 at a desired orientation, moving stabilizers 180 to compensate for desired displacements along several axes, and fixedly coupling stabilizers 180 to lens assembly 140 and frame 220.

Although described above in regards to use of two stabilizers, it should be appreciated that one, two, three or more stabilizers may be employed without departing from the scope of the disclosure. One or more the stabilizers may provide adjustment capabilities in one or more axes. For example, in some embodiments, a single stabilizer 180 may be used where bracket 410 may be coupled directly to lens assembly 140. Bracket may be configured with a lateral slot extending along its outer surface, the lateral slot having such a width that the shaft of a selected screw may pass through the slot and engage projection lens assembly. Where the bracket is coupled to the lens assembly, the slot in the bracket may be sized to receive the screw such that it passes through both the slots to couple the bracket to the lens assembly. In such embodiments, the radius of curvature of the outer surface of the bracket may be substantially similar, in a geometrical sense, to that of the outer surface of lens assembly. For example, in one configuration, a screw may loosely couple bracket 410 to projection lens assembly 140 such that the length of slots 432, 433 provide a margin of rotation for projection lens assembly 140 relative to bracket 410. In this configuration, the position of the lens assembly may be adjusted. In a second configuration, the bracket may be securely coupled to projection lens assembly such that the lens assembly may be fixed with respect to the frame of the projection device.

Although the present disclosure includes specific embodiments, specific embodiments are not to be considered in a limiting sense, because numerous variations are possible. The subject matter of the present disclosure includes all novel and nonobvious combinations and subcombinations of the various elements, features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring, nor excluding two or more such elements. Other combinations and subcombinations of features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. An apparatus for positioning an optical component relative to a frame, the apparatus comprising:
   a stabilizer configured to be coupled to the optical component and the frame, the stabilizer having at least a first configuration and a second configuration, where in the first configuration the stabilizer is configured to enable select adjustment by at least rotation of the optical component relative the frame and translation of the optical component relative the frame and where in the second configuration the stabilizer is configured to fix the position of the optical component relative the frame.

2. The apparatus of claim 1, wherein the optical component is a lens assembly for a projection device.

3. The apparatus of claim 1, wherein the stabilizer includes a bracket configured to be coupled to the frame and a cradle adapted to be received within the bracket, wherein the cradle is configured to engage the optical component.

4. The apparatus of claim 3, wherein the bracket is configured to allow at least partial rotation of the cradle.

5. The apparatus of claim 1, wherein the stabilizer includes at least a first slot disposed to enable adjustment in a first direction.

6. The apparatus of claim 5, wherein the stabilizer includes at least a second slot disposed to enable adjustment in a second direction.

7. The apparatus of claim 6, wherein the second direction is substantially perpendicular to the first direction.

8. An apparatus for stabilizing an optical component relative to a frame, the apparatus comprising:
   a bracket, wherein the bracket is configured to be coupled to the frame; and
   a cradle, wherein the cradle engages the bracket and is configured to engage the optical component such that the optical component may be stabilized at an orientation that is variable in at least two directions.

9. The apparatus of claim 8, wherein the optical component is a lens assembly for a projection device.

10. The apparatus of claim 8, wherein the cradle and bracket are configured to enable selective adjustment of the optical component in a first direction and are further configured to fix the optical component in a select position in the first direction.

11. The apparatus of claim 10, wherein the cradle and bracket are configured to enable selective adjustment of the optical component in a second direction and are further configured to fix the optical component in a select position in the second direction.

12. The apparatus of claim 11, wherein the cradle and bracket are configured to enable selective adjustment of the optical component in a third direction and are further configured to fix the optical component in a select position in the third direction.

13. The apparatus of claim 11, wherein the cradle is configured to enable rotation of the lens assembly.

14. A system for stabilizing an optical component, the system comprising:
   an optical component;
   a frame;
   a bracket, wherein the bracket is coupled to the frame; and
   a cradle, wherein the cradle engages the bracket and the optical component such that the optical component may be stabilized at an orientation that is variable in at least two directions.

15. The system of claim 14, wherein the optical component is a lens assembly for a projection device.

16. The system of claim 14, wherein the cradle engages the optical component with a surface that is shaped to fit the engaged surface of the optical component.

17. The system of claim 14, wherein the bracket comprises a guide such that the bracket does not tilt with respect to the plane within which it is coupled to the frame.

18. The system of claim 14, wherein the bracket is coupled to the optical component.

19. The system of claim 14, where, in a first configuration, the bracket is movably coupled to the frame, the cradle is pivotably engaged to the bracket, and the cradle is movably engaged to the optical component.

20. The system of claim 19, where, in a second configuration, the bracket is fixedly coupled to the frame, the cradle is fixedly engaged to the bracket, and the cradle is fixedly engaged to the optical component.

21. The system of claim 14, wherein:
   the bracket is configured to be selectively adjusted with respect to the frame along a first axis;
   the cradle is configured to be selectively pivoted with respect to the bracket on a second axis orthogonal to the first axis; and
   the cradle is configured to engage the optical component to enable rotation of the optical component, with an axis of rotation orthogonal to the first axis.

22. The system of claim 14, further comprising:
   a second bracket, wherein the second bracket is coupled to the frame; and
   a second cradle, wherein the second cradle engages the second bracket and the optical component such that the optical component may be stabilized at an orientation that is variable in at least two directions.

23. The system of claim 22, wherein the first and second cradles are disposed on substantially opposite sides of the optical component.

24. The system of claim 23, wherein the first and second cradles are both coupled to the optical component.

25. A projection device comprising:
   a frame;
   a lens assembly;
   a stabilizer, wherein the stabilizer is configured to be coupled to the frame, and where the stabilizer is configured to movably engage the lens assembly, and pivotably support the lens assembly, such that the lens assembly may be positioned at an orientation that is variable by at least rotation of the lens assembly with respect to the frame and by translation of the lens assembly with respect to the frame.

26. The projection device of claim 25, wherein the stabilizer includes a cradle end a bracket.

27. The projection device of claim 25, wherein the stabilizer is configured to enable select adjustment of the lens assembly in a first direction.

28. The projection device of claim 25, wherein the stabilizer is configured to enable select adjustment of the lens assembly in a second direction substantially perpendicular to the first direction.

29. The projection device of claim 26, wherein the cradle is configured to enable select rotation of the optical component.

30. The projection device of claim 25, wherein the lens assembly is configured to be maintained in a select position by the stabilizer.

31. The projection device of claim 25, further including a first and a second stabilizer disposed on substantially opposite sides of the lens assembly to support the lens assembly in a select position.

32. A method for stabilizing a lens assembly relative to a frame, the method comprising:
   positioning the lens assembly in a desired operational orientation relative to the frame;
   positioning a stabilizer to engage the lens assembly and the frame, wherein the stabilizer is adjustable to enable at least a rotational adjustment and a translational adjustment of the lens assembly relative the frame; and
   securing the stabilizer to stabilize the lens assembly at the desired operational orientation relative to the frame.

33. The method of claim 32, wherein positioning a stabilizer includes adjusting the position of the lens assembly to a desired operational orientation.

34. The method of claim 33, wherein adjusting the position of the lens assembly includes adjusting the lens assembly in a first direction.

35. The method of claim 34, wherein adjusting the position of the lens assembly includes adjusting the lens assembly in a second direction orthogonal to the first direction.

36. The method of claim 35, wherein adjusting the position of the lens assembly includes rotating the lens assembly to the desired operational orientation.

37. The method of claim 33, wherein stabilizing the stabilizer includes securing the stabilizer to the lens assembly and the frame such that the lens assembly is in a fixed position.

38. The apparatus of claim 3, wherein the bracket includes a substantially flat surface and the cradle includes a curved surface, and the stabilizer further includes a fastener to fix the curved surface of the cradle in a selected orientation relative to the flat surface of the bracket.

39. The apparatus of claim 8, wherein the bracket includes a substantially flat surface and the cradle includes a curved surface, and the stabilizer further includes a fastener to fix the curved surface of the cradle in a selected orientation relative to the flat surface of the bracket.

40. The apparatus of claim 14, wherein the bracket includes a substantially flat surface and the cradle includes a curved surface, and the stabilizer further includes a fastener to fix the curved surface of the cradle in a selected orientation relative to the flat surface of the bracket.

41. The apparatus of claim 26, wherein the bracket includes a substantially flat surface and the cradle includes a curved surface, and the stabilizer further includes a fastener to fix the curved surface of the cradle in a selected orientation relative to the flat surface of the bracket.

* * * * *